United States Patent [19]
Delrue et al.

[11] Patent Number: 6,033,709
[45] Date of Patent: Mar. 7, 2000

[54] PROCESS FOR THE PRODUCTION OF PARTIALLY GELATINIZED RICE FLOUR

[75] Inventors: Rita M. Delrue, Minnetonka; Laurie W. Chamberlin, Victoria, both of Minn.

[73] Assignee: Cargill, Incorporated, Minneapolis, Minn.

[21] Appl. No.: 09/137,923

[22] Filed: Aug. 20, 1998

[51] Int. Cl.$^7$ ................................................ A23L 1/00
[52] U.S. Cl. ...................... 426/510; 426/506; 426/511; 426/523
[58] Field of Search .................. 426/506, 510, 426/511, 496, 523

[56] References Cited

U.S. PATENT DOCUMENTS

| | | |
|---|---|---|
| Re. 31,513 | 1/1984 | Glen .......................................... 426/521 |
| 198,192 | 12/1877 | D'Heureuse . |
| 1,010,202 | 11/1911 | Thomas . |
| 1,574,210 | 2/1926 | Spaulding . |
| 2,704,257 | 3/1955 | DeSollano et al. ........................ 99/93 |
| 3,035,918 | 5/1962 | Sorgenti et al. ............................ 99/1 |
| 3,159,493 | 12/1964 | Japikse et al. ............................ 99/216 |
| 3,159,494 | 12/1964 | Lawrence et al. ........................ 99/216 |
| 3,194,664 | 7/1965 | Eytinge ..................................... 99/80 |
| 3,212,904 | 10/1965 | Gould et al. ................................ 99/93 |
| 3,368,902 | 2/1968 | Berg ........................................... 99/83 |
| 3,404,986 | 10/1968 | Wimmer et al. ............................. 99/93 |
| 3,554,772 | 1/1971 | Hankinson et al. ...................... 99/215 |
| 3,653,915 | 4/1972 | Rubio ..................................... 99/80 R |
| 3,655,385 | 4/1972 | Rubio ..................................... 99/80 R |
| 3,859,452 | 1/1975 | Mendoza ................................ 426/375 |
| 4,221,340 | 9/1980 | dos Santos ................................ 241/7 |
| 4,255,459 | 3/1981 | Glen ....................................... 426/521 |
| 4,329,371 | 5/1982 | Hart ....................................... 426/375 |
| 4,385,074 | 5/1983 | Weibye ................................... 426/511 |
| 4,543,263 | 9/1985 | Goldhahn ............................... 426/520 |
| 4,547,383 | 10/1985 | Goldhahn ............................... 426/524 |
| 4,555,409 | 11/1985 | Hart ....................................... 426/242 |
| 4,594,260 | 6/1986 | Vaqueiro et al. ........................ 426/622 |
| 4,770,891 | 9/1988 | Willard ................................... 426/559 |
| 4,844,937 | 7/1989 | Wilkinson et al. ...................... 426/559 |
| 4,882,188 | 11/1989 | Sawada et al. ......................... 426/438 |
| 4,985,269 | 1/1991 | Irvin et al. .............................. 426/560 |
| 4,996,063 | 2/1991 | Inglett ....................................... 426/21 |
| 5,176,931 | 1/1993 | Herbster .................................. 426/42 |
| 5,225,224 | 7/1993 | VanNortwick .......................... 426/549 |
| 5,296,253 | 3/1994 | Lusas et al. ............................. 426/629 |
| 5,505,978 | 4/1996 | Roy et al. ............................... 426/549 |
| 5,532,013 | 7/1996 | Martinez-Bustos et al. ........... 426/496 |
| 5,558,886 | 9/1996 | Martinez-Bustos et al. ........ 425/376.1 |
| 5,558,898 | 9/1996 | Sunderland ............................. 426/626 |
| 5,589,214 | 12/1996 | Palm ....................................... 426/506 |
| 5,652,010 | 7/1997 | Gimmler et al. ....................... 426/549 |
| 5,700,505 | 12/1997 | Hurst ..................................... 426/312 |

FOREIGN PATENT DOCUMENTS 196464  10/1986  European Pat. Off. .
WO 97/29647  8/1997  WIPO .

OTHER PUBLICATIONS

Watson, S.A., in "Corn: Chemistry and Technology", 1987. *Am. Assoc. Cereal Chemists,* pp. 410–429.

Parades–Lopez, O. et al., "Maize, A revies of tortilla production technology", *Bakers Digest,* Sep. 13, 1983, pp. 16–25.

Khan, M.N. et al., "Corn Tortillas: Evaluation of Corn Cooking Procedures", *Cereal Chem.,* 59:279–284, 1982.

Bedolla, S. et al., "Cooking Maize for Masa Production", *Cereal Foods World,* 27:219–221, 1982.

Bazua, C.D. et al., Extruded Corn as an Alternative to Lime–Heated Corn Flour for Tortilla Preparation, *Inst. Food Technologists,* 1979.

Mensah–Agyapong, J. et al.. "Nixtamalization of Maize (zea mays L) Using a Single Screw Cook–Extrusion Process on Lime–Treated Grits", *J. Sci. Food Agric.,* 60:509–514, 1992.

Martinez et al., "Caracteristicas quimicas y usos de harina instantanea de maiz II.", *Archivos Latinoamericanos de Nutricion* 1993, 43, 316–320.

*Primary Examiner*—George C. Yeung
*Attorney, Agent, or Firm*—Fitch, Even, Tabin & Flannery

[57] ABSTRACT

The invention is directed to a continuous process for the production of rice flour and dough. Rice flour and dough is made by hydrating rice flour or a blend of rice flour and other cereal components, tempering, and then cooking to partially gelatinize the starch in the flour.

15 Claims, 1 Drawing Sheet

6,033,709

PROCESS FOR THE PRODUCTION OF PARTIALLY GELATINIZED RICE FLOUR

FIELD OF THE INVENTION

The present invention relates to the making of dough from rice flour. More particularly, this invention is directed to the production of partially gelatinized flour and dough which is made by blending the flour with water, hydrating the flour, tempering the hydrated flour and cooking the tempered flour to partially gelatinize the starch in the flour.

BACKGROUND OF THE INVENTION

Flour and Dough

Using and completely cooking rice flour limits flexibility for any process where food products are customized snack foods and the like which require a combination of rice flour or dough with other types of flour and dough, such as masa dough or wheat dough. Providing partially gelatinized rice flour using the process of the invention described herein permits customization of a dough which includes rice dough to a particular product using a continuous process without extensive shut down times.

An object of this invention is to provide a new flexible process for the production of partially gelatinized rice flour and dough.

These and other objects, advantages, features and characteristics of the present invention will become more apparent upon consideration of the following description and claims.

SUMMARY OF THE INVENTION

This invention is directed to a continuous process for the production of partially gelatinized rice flour and dough. In the process, rice flour or a blend of rice flour with other components of one or more other cereal grains is hydrated to provide a hydrated rice flour (or blend of rice flour and one or more additional cereal components) which has a moisture content of at least 20 weight percent. The additional cereal components may include flour from other cereals, such as wheat flour and oat flour.

In an important aspect, during hydration, the rice flour is mixed with water having a temperature of at least about 10° C., but not at a temperature that would substantially gelatinize the starch in the flour. Generally the temperature of the water/flour blend should not exceed about 60° C. The mixing of the water/flour blend should be effective to substantially, uniformly distribute water throughout the blend to the moisture level of the at least about 20 weight percent. In another important aspect, the hydrated rice flour blend has a moisture content of from about 26 to about 30 weight percent water, based upon the weight of the rice flour and water.

After hydration, the hydrated rice flour is tempered for a time to equally distribute moisture throughout the flour. Generally, tempering times range from about 30 seconds to about 12 minutes, depending upon the type and the particle size of the flour in the hydrated flour.

After tempering, the tempered flour enters a cooker to cook it in a cooking process which utilizes direct and indirect heat. The indirect heat keeps the cooker and dough at an elevated temperature which is effective for keeping the cooker clean of partially cooked residual dough. The direct heat, such as from the injection of steam into the tempered product, cooks the dough in combination with the indirect heat. The combination of indirect and direct heat brings the temperature of the tempered product to a temperature of at least about 165° F. as it leaves the cooker and partially gelatinizes the starch in the flour and starch in any other cereal components with which the rice flour may be blended or mixed. After the partial gelatinization not more than about 90 weight percent of the starch in the rice flour or rice flour blend is gelatinized, and in an important aspect, not more than about 70 weight percent of the starch in the rice flour or blend is gelatinized. The tempered product is directly exposed to steam for about 1 to about 10 minutes, and preferably from about 1 to about 2 minutes, with the cooking temperature also potentially being affected by a subsequent drying step.

After cooking the cooked rice flour or rice flour blend, the rice flour may be dried to a moisture content of not more than about 15 weight percent at a temperature which is effective for not heat damaging or burning the product. Generally, during drying the product temperature should not exceed 95° F. After drying the dried rice flour or blend is sized, such as by milling and sifting to a particle size of from about 16 to about 65 mesh, depending upon what type of food product will be made with the component blend. The process of the invention is effective for hydrating, tempering and cooking the rice flour or component blend, such that waste water is not created and process may be carried out without water being removed from the rice flour or component blend after hydrating, tempering or cooking. Moreover, the process is effective for providing a product which does not require washing after the hydration or cooking steps.

DETAILED DESCRIPTION OF THE INVENTION

Figure 1:
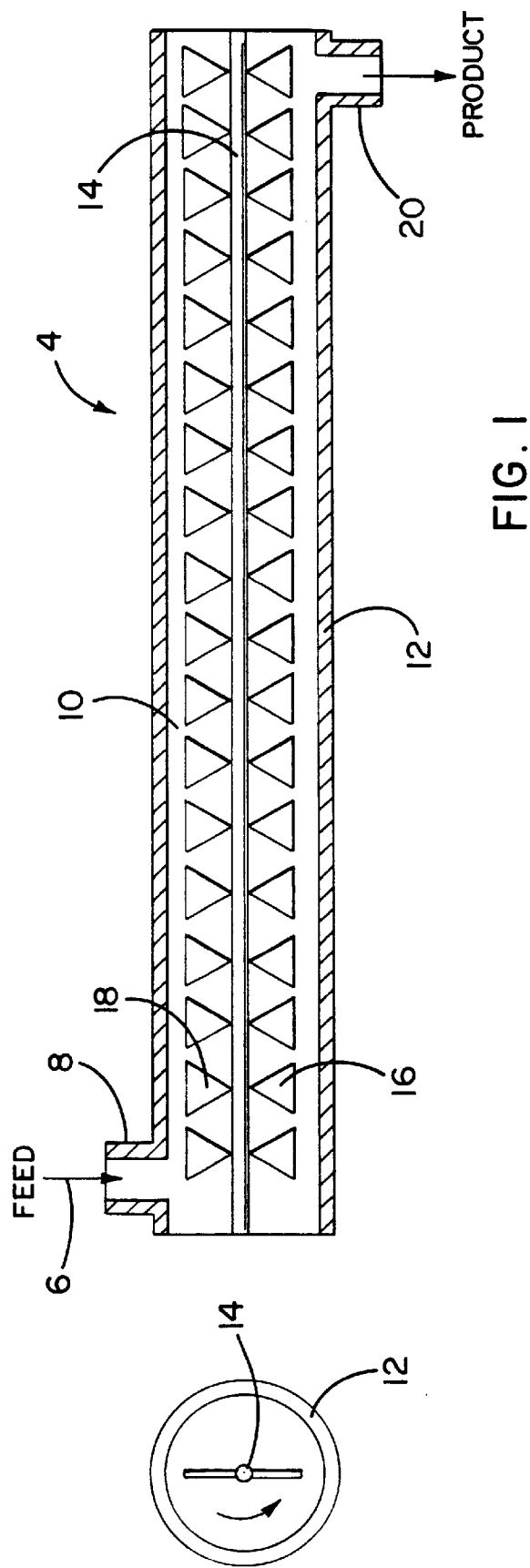
FIG. 1 is a schematic illustration of a cooker used in the process of the invention.

The process includes hydrating rice flour and/or hydrating rice flour with other components, such as components from other cereals, such as corn. In the case of corn, these components include (1) corn germ, or (2) corn grits and corn germ, or (3) corn grits, corn germ and corn bran, or (4) corn germ and corn bran, or (5) corn bran, or (6) corn grits and corn bran, or (7) ground whole corn to provide a rice flour or a rice flour component blend. The rice flour or component blend may be mixed dry and then mixed with water for hydration of the blend or may be separately mixed into water for hydration of the blend. Thereafter, the rice flour or component blend is hydrated with water to provide a hydrated corn component blend which has a moisture content of at least about 20 weight percent. After hydration the process includes tempering the hydrated rice flour or component blend to provide a tempered rice flour or component blend, cooking the tempered rice flour or component blend with indirect heat and direct steam. After cooking, the cooked product with the partially gelatinized starch may be used as a dough. In an important aspect, however, this cooked product is dried and optionally milled and sized.

Hydration Step

The rice flour or rice flour component blend is mixed with water in a high-speed mixer. The temperature of the hydrating water varies between about 10° C. to about 60° C. The temperature of the hydrating water depends on the time required for full hydration, and also on the size of the particles in the blend. The time for the hydration can vary between 5 minutes and 4 hours.

The temperature of the hydrating water varies between about 10° C. and about 60° C., and preferably from about 25° C. to about 60° C. Higher temperatures can be used, but they are not advisable because during the mixing, heating can occur. Any heating which results in substantial gelatinization of the starch in the flour or in any component of the blend should be avoided because such gelatinization will not provide a uniform final product for the cooking step. In this respect, substantial gelatinization means the starch granule structure is not disrupted and there is no loss of bifringency prior to cooking, such as more than about 5 percent weight percent of the starch in the flour or blend is gelatinized.

The preferred mixer for the process is a turbulizer as supplied by Hosokawa Bepex, but other high-speed mixers available can be used. Mixing during hydration is important to substantially uniformly distribute water throughout the whole raw mix. Time is not critical as long as the moisture is substantially evenly distributed throughout the rice flour or component blend to a moisture level of at least about 20 weight percent, in an important aspect, in a range of from about 23 to about 34 weight percent, and preferably about 26 to about 30 weight percent, based upon the weight of the hydrated blend.

Tempering

After hydration, the hydrated rice flour or component blend is kept or tempered for a few minutes to make sure the moisture is equally distributed throughout all of the flour or component particles. This can be done by methods including the use of a standard transport screw or a tempering vessel. It is not essential, but advisable, to maintain a constant temperature during that process. Tempering times can vary between about 30 seconds and about 12 minutes. Long tempering times are not advisable as microbial growth can occur. Long tempering times are not required as the rice flour particles are small enough to make sure all the water is equally distributed throughout the product and a uniform mixture is obtained for the cooking.

Cooking

The cooker cooks with indirect and direct heat, such as a screw-type cooker and partially gelatinizes the starch in the rice flour or component blend. This cooker, as shown in FIG. 1, is a elongated heating device which has a heat jacket surrounding a channel through which the tempered product is conveyed. The hydrated and tempered product is moved forward down the cooker by means of paddles on a hollow rotor in the device. The rotor is connected to a steam source to transmit steam to the paddles which are hollow and are open to receive steam from the rotor. Steam enters the rotor and is conveyed therethrough into the paddles which have one or more holes from which the steam is injected into the tempered product. The paddles uniformly distribute the steam in the product being cooked. Indirect heat is applied from the jacket of the device. The direct heat brings the tempered product to temperature, partially gelatinizing starch while the indirect heat keeps the cooker and dough at an elevated temperature which is effective for keeping the cooker clean of partially cooked residual dough. Cooking conditions are controlled through selection of a specific length for the device, the number of open steam holes in the paddles, the amount of indirect heat being applied and the rate the tempered product is conveyed through the cooker.

Referring to FIG. 1 for more detail, the tempered product is fed into a elongated heating device 4 shown in FIG. 1. The tempered product is fed into the heating device feed aperture 8 into channel 10. The tempered product is conveyed down channel 10 in the y direction. Channel 10 is surrounded by a steam jacket 12 through which steam is circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles, mix the tempered product and push the product down channel 10. The paddles have openings 18 which extend through the paddles to the hollow center of rod 14. These openings are to transmit steam going through the rod and paddles so that the steam may be injected into the particulate food product being transmitted down channel 10. As the rod rotates the paddles push product down the conduit to exit aperture 20 through which the cooked dough flows. The openings in the paddles may be opened or closed to control steam injection into the product being transmitted down the channel. The amount of steam injected is effective for heating and cooking the product such that a product with partially gelatinized starch is obtained. Additional indirect heating of the tempered product and the cooking channel is done by using indirect heat from the jacket of the device. Enough steam is injected to cook the tempered product and gelatinize the starch therein and to provide the cooked product with a temperature of at least about 165° F. A device which can be used to cook the tempered product as described herein is available as a Solidaire Model SJCS 8-4 from the Hosokawa Bepex Corporation, 333 N.E. Taft Street, Minneapolis, Minn. 55413.

The direct heat, such as from the injection of steam into the tempered product, cooks the dough in combination with the indirect heat. The indirect heat may be provided by steam or oil. The combination of indirect and direct heat brings the temperature of the tempered product to a temperature of at least about 165° F. as it leaves the cooker. The tempered product is directly exposed to steam for about 1 to about 10 minutes, and preferably from about 1 to about 2 minutes, with the cooking time and temperature also potentially being affected by the temperature in the subsequent drying step. When lower temperatures are used during drying, higher temperatures are used during cooking and vice versa.

The cooking temperature as measured by the temperature of the product as it leaves the cooker is a function of the type of the product that is desired and the drying temperatures which are subsequent to the cooking step. When lower drying temperatures are used, such as when the inlet temperature of the drier is 370° F., significant cooking in the dryer does not occur. When lower drying temperatures are used, the temperature of the cooked product as it leaves the cooker is in the higher end of the range of from about 185° F. to about 210° F. When higher temperatures are used, such as about 500° F. for inlet air temperature, and the temperature of the dried product exceeds 85° C., the cooked product leaves the cooker at the lower end of the latter range, about 160° F. to about 200° F. Overcooking will result in a sticky dough when further processing it. In an important aspect, cooked product may be used directly in further processing and cooking, such as in snack foods. In a very important aspect, cooked product is dried to provide a product with partially gelatinized starch.

Drying

Conventional techniques, such as a flashdryer or belt dryer, can be used for drying the cooked mixture to provide a product with partially gelatinized starch and a product with a moisture level of not more than about 15 weight percent. Alternatively, a Micron dryer, as supplied by Hosokawa Bepex, or a flash dryer may be used. In this system there is also a classifier system which mills the cooked product in such a manner that the right final granulation of the dried flour is obtained for specific applications. For applications where a coarser granulation is required, this air-classification system can be reduced to a minimal level to make sure that still the required coarse particles are present.

The temperatures used during the drying depend upon the temperatures and moisture used during cooking stage. If a high temperature is used during the cooking, a lower temperature can be used during the drying process. If lower temperature and lower moisture levels are used during the cooking, higher temperatures are used during the drying stage to make sure that some cooking is obtained during the drying step. However, a fine balance is kept to prevent the product from heat damage during the drying process. Such heat damage will result in a masa which does not form a proper cohesive dough and which is discolored.

Sizing of the Dried Product

The dried rice product is sifted on a standard sieve to obtain the right granulation. Coarse fractions can be removed and milled to a smaller granulation. Too fine product can be removed if necessary.

The follow examples describe and illustrate the process of the invention and the rice flour prepared by the process of the invention.

EXAMPLE I

Rice flour is hydrated by mixing with water using a turbulizer.

The hydrated product then is heated in a Solidaire 6 from Hosokawa Bepex Corporation, paddles open for steam injection. The cooked product then is dried.

| Product Run | 1 | 2 | 3 | 4 | 5 | 6 | 7 |
|---|---|---|---|---|---|---|---|
| Cooker Feed Rate lb/hr | 300 | 300 | 300 | 300 | 300 | 300 | 300 |
| Indirect Steam Temp ° F. | | 215 | 215 | 215 | 215 | 215 | 215 |
| Direct Steam Temp ° F. | | 259 | 259 | 259 | 259 | 259 | 259 |
| Tempering Time | | 8 min | 8 min | 8 min | 8 min | 8 min | 8 min |
| Hydration % H20 | 26.02 | | | | | | |
| % Moisture after cooking | | 30.54 | | 30.24 | 29.83 | | |
| Cooking Temp ° F. | | 207.1 | 208.5 | 208.7 | 208.4 | 208.5 | 208.5 |
| % Finished Product Moisture | | | 13.9 | | 10.43 | | 10.68 |

RVA 25% d.s.

| | |
|---|---|
| 5 min. | 910 |
| 10 min. | 910 |
| 12.5 min. | 901 |

RVA: rapid visco analyzer. Equipment to measure the viscosity. We make a solution of varying % of dry solids solutions and measure over a period of 12.5 minutes the viscosity. Viscosity is expressed in cPoise.

EXAMPLE II

| Product Run | 1 | 2 | 3 | 4 | 5 | 6 | 7 |
|---|---|---|---|---|---|---|---|
| Cooker Feed Rate lb/hr | 300 | 300 | 300 | 300 | 300 | 300 | 300 |
| Indirect Steam Temp ° F. | | 215 | 215 | 215 | 215 | 215 | 215 |
| Direct Steam Temp ° F. | 259 | 259 | 259 | 259 | 259 | 259 | 259 |
| Tempering Time | 8 min | 8 min | 8 min | 8 min | 8 min | 8 min | 8 min |
| Hydration % H20 | | 26.72 | | | | | |
| % Moisture after cooking | 29.56 | | | 28.51 | | 28.56 | |
| Cooking Temp ° F. | 208.1 | 208.3 | 208.5 | | 209.1 | 209.3 | 209.5 |
| % Finished Product Moisture | 10.68 | | | 11.53 | 10.65 | 9 | 9.8 |
| RVA (d.s.) | | 30% | 30% | | 25% | 30% | 30% |
| 5 min | | 3042 | 1080 | | 1081 | 1916 | 1636 |
| 10 min | | 4023 | 1307 | | 1273 | 2483 | 2056 |
| 12.5 min | | 4278 | 1371 | | 1364 | 2694 | 2211 |

EXAMPLE III

| Product Run | 1 | 2 | 3 | 4 | 5 | 6 | 7 |
|---|---|---|---|---|---|---|---|
| Cooked Feed Rate lb/hr | 300 | 300 | 300 | 300 | 300 | 300 | 300 |
| Indirect Steam Temp ° F. | 215 | 234 | 234 | 285 | 285 | 285 | 260 |
| Direct Steam Temp ° F. | 259 | 256 | 256 | 259 | 259 | 259 | 259 |
| Tempering Time | 8 min | 8 min | 8 min | 8 min | 8 min | 8 min | 8 min |
| Hydration % H20 | | | | | | 28.91 | |
| % Moisture after cooking | | 27.75 | 27.78 | 211.1 | 211.4 | 212.1 | 210.1 |
| Cooking Temp | | 210.9 | 212 | | | | |
| % Finished Product Moisture | 9.85 | 8.89 | | | | | |
| RVA (d.s.) | 30% | 25% | 30% | 25% | 25% | 25% | |
| 5 min | 2035 | <100 | 1376 | 149 | 761 | 1172 | |
| 10 min | 2696 | <100 | 1265 | 56 | 898 | 1414 | |
| 12.5 min | 2976 | <100 | 1138 | 165 | 931 | 1563 | |

EXAMPLE IV

| Product Run | 1 | 2 | 3 | 4 | 5 | 6 | 7 |
|---|---|---|---|---|---|---|---|
| Cooked Feed Rate lb/hr | 300 | 300 | 300 | 300 | 300 | | |
| Indirect Steam Temp ° F. | 260 | 260 | 260 | 260 | 260 | | |
| Direct Steam Temp ° F. | 259 | 259 | 259 | 259 | 259 | | |
| Tempering Time | 8 min | 8 min | 8 min | 8 min | 8 min | | |
| Hydration % H20 | 29.01 | | | | | | |
| % Moisture after cooking | | 30.05 | | | 30 | | |

-continued

| Product Run | 1 | 2 | 3 | 4 | 5 | 6 | 7 |
|---|---|---|---|---|---|---|---|
| Cooking Temp. | 210.5 | 210.2 | 210.2 | 210.7 | 210.7 | | |
| % Finished Product Moisture | | 6.71 | | | | | |
| RVA (d.s.) | 25% | 25% | | | | | |
| 5 min | 7055 | 6271 | | | | | |
| 10 min | 8259 | 7177 | | | | | |
| 12.5 min | 8555 | 7434 | | | | | |

EXAMPLE V

| | Ash | Free Fat | Protein | Starch | Starch Damage | H20 |
|---|---|---|---|---|---|---|
| S1 | 0.44 | 0.62 | 8.21 | 78 | 4.5 | 11.94 |
| S2 | 0.46 | 0.23 | 8.33 | 79.5 | 13.4 | 10.78 |
| S3 | 0.46 | 0.28 | 8.32 | 79.16 | 15.7 | 10.95 |
| S5 | 0.4 | 0.37 | 8.18 | 78.1 | 2.5 | 12.89 |
| S6 | 0.4 | 0.47 | 8.13 | 80 | 10.9 | 11.94 |
| S7 | 0.4 | 0.23 | 8.27 | 79.26 | 15.7 | 11.77 |

S1 and S5 are plain flour, not treated according to the invention. S2, S3, S6, and S7 are partially cooked rice flour processed in accordance with the invention.

EXAMPLE VI

| RVA Viscosity 50° C. Profile, 35% d.s. | | | |
|---|---|---|---|
| | 5 min. | 12.5 min. | Differ. |
| S1 | 233 | 245 | 239 |
| S2 | 7639 | 9312 | 9870 |
| S3 | 12295 | 13502 | 13845 |
| S5 | 118 | 105 | 112 |
| S6 | 24650 | 26204 | 26185 |
| S7 | n.a. | n.a. | n.a. |

EXAMPLE VII

| | 5 min. | 10 min. | 12.5 min. |
|---|---|---|---|
| RVA Viscosity 50° C. Profile, 25% d.s. | | | |
| S5 | <100 | <100 | <100 |
| S6 | 287 | 276 | 265 |
| S7 | 460 | 467 | 506 |
| RVA Viscosity 50° C. Profile, 30% d.s. | | | |
| S1 | <100 | <100 | <100 |
| S2 | 1082 | 1164 | 1191 |
| S3 | 3256 | 4130 | 4480 |

EXAMPLE VIII

| | Granulation (%) | | | | | |
|---|---|---|---|---|---|---|
| Mesh Size | S1 | S2 | S3 | S5 | S6 | S7 |
| >325 | 13.2 | 2.3 | | | | |
| 200 | 10.6 | 3.2 | 4.3 | | | |
| 100 | 43.6 | 8.6 | 23.2 | 25.5 | 11.6 | 7.8 |
| 80 | 17 | 43.6 | 17.9 | 7.7 | 6.7 | 5 |
| 60 | 14.3 | 31 | 34.6 | 3.2 | 10 | 9.8 |
| 40 | 1.3 | 11.3 | 17.5 | 28.2 | 28.5 | 28.6 |
| 20 | 0 | 0 | 0 | 35.4 | 43.2 | 46.3 |
| 16 | 0 | 0 | 0 | 0 | 0 | 0 |
| | 100 | 100 | 100 | 100 | 100 | 100 |

EXAMPLE IX

| Partially cooked coarse Rice Flour RVA: 20% d.s. | | | |
|---|---|---|---|
| RVA Viscosity | Coarse | Flour | 50 Deg. |
| 20% d.s. | 5 | 12.5 | 12.5–5 |
| S8 | 411 | 390 | −21 |
| S9 | 74 | 66 | −8 |
| S10 | 52 | 59 | 7 |
| RVA Viscosity, 25% d.s. | | | |
| S8 | 10808 | 14792 | 3984 |
| S9 | 313 | 318 | 5 |
| S10 | 214 | 219 | 5 |
| RVA Viscosity, 30% d.s. | | | |
| S8 | >16,000 | n.a. | n.a. |
| S9 | 4739 | 5939 | 1200 |
| S10 | 3113 | 4266 | 1153 |

What is claimed is:

1. A process for making rice dough having partially gelatinized starch, the process comprising:
   hydrating the rice flour with water to a moisture level of at least about 20 weight percent, based upon the weight of the flour and water to provide a hydrated flour;
   tempering the hydrated flour for at least about 30 seconds to provide a tempered flour;
   cooking the tempered flour with indirect heat and the direct application of steam to bring the tempered flour to a temperature of at least about 165° F. to provide a cooked rice flour having not more than about 90 weight percent of the starch therein gelatinized.

2. The process as recited in claim 1 further comprising drying the cooked rice flour to a moisture content of not more than about 15 weight percent moisture to provide a dried, cooked rice flour.

3. The process as recited in claim 1 wherein the water during the hydration of rice flour has a temperature of at least about 10° C. and the rice flour and water are mixed at a rate which is effective for distributing the water substantially uniformly throughout the rice flour.

4. The process as recited in claim 1 wherein the hydrated flour is brought to a moisture level of from about 26 to about 30 weight percent.

5. The process as recited in claim 1 wherein not more than about 70 weight percent of the starch in the rice flour is gelatinized.

6. The process as recited in claim 3 wherein during hydration the water has a temperature of from about 10° C.

to about 60° C. and the hydrated flour is tempered for about 30 seconds to about 12 minutes.

7. The process as recited in claim 6 wherein during cooking the tempered flour is exposed to steam for about 1 to about 10 minutes.

8. The process as recited in claim 7 wherein the rice flour further includes a corn component selected from the group consisting of corn germ, a corn grit and corn germ blend, a corn grit, corn germ and corn bran blend, a corn germ and corn bran blend, corn bran, a corn grit and corn bran blend, and ground whole corn.

9. A process for making rice dough having partially gelatinized starch, the process comprising:

blending rice flour and a cereal component selected from the group consisting of wheat flour, oat flour and mixtures thereof to provide a rice flour cereal component blend;

hydrating the rice flour cereal component blend with water to a moisture level of at least about 20 weight percent, based upon the weight of the rice flour cereal component blend and water to provide a hydrated rice flour cereal component blend;

tempering the hydrated rice flour cereal component blend for at least about 30 seconds to provide a tempered rice flour cereal component blend;

cooking the tempered rice flour cereal component blend with indirect heat and the direct application of steam to bring the tempered rice flour cereal component blend to a temperature of at least about 165° F. to provide a cooked rice flour cereal component blend having not more than about 90 weight percent of the starch therein gelatinized.

10. The process as recited in claim 9 further comprising drying the cooked rice flour cereal component blend to a moisture content of not more than about 15 weight percent moisture to provide a dried, cooked rice flour cereal component blend.

11. The process as recited in claim 9 wherein the water during the hydration of rice flour cereal component blend has a temperature of at least about 10° C. and the rice flour cereal component blend and water are mixed at a rate which is effective for distributing the water substantially uniformly throughout the rice flour cereal component blend.

12. The process as recited in claim 9 wherein the hydrated rice flour cereal component blend is brought to a moisture level of from about 26 to about 30 weight percent.

13. The process as recited in claim 9 wherein not more than about 70 weight percent of the starch in the rice flour cereal component blend is gelatinized.

14. The process as recited in claim 11 wherein during hydration the water has a temperature of from about 10° C. to about 60° C. and the hydrated rice flour cereal component blend is tempered for about 30 seconds to about 12 minutes.

15. The process as recited in claim 14 during cooking the tempered rice flour cereal component blend is exposed to steam for about 1 to about 10 minutes.

* * * * *